UNITED STATES PATENT OFFICE.

JOHN H. STEPHENS, OF VERNON, TEXAS.

COMBINED COMPUTING DEVICE AND WEIGHING-SCALE.

SPECIFICATION forming part of Letters Patent No. 628,559, dated July 11, 1899.

Application filed January 6, 1898. Serial No. 665,789. (No model.)

*To all whom it may concern:*

Be it known that I, JOHN H. STEPHENS, a citizen of the United States, residing at Vernon, in the county of Wilbarger and State of Texas, have invented certain new and useful Improvements in a Combined Computing Device and Weighing-Scale; and I do hereby declare the following to be a full, clear, and exact description of the invention, such as will enable others skilled in the art to which it appertains to make and use the same.

My invention has reference to improvements in computing devices in combination with weighing-scales; and it consists of certain novel features of construction which will be hereinafter fully described in the specification, illustrated in the drawings, and pointed out in the claims.

The object of the present invention is to construct a simple, economical, and portable combined computing and weighing scale for ordinary use so simple in its operation that an illiterate person can manipulate it with as much facility as one trained to the practical use of more complicated devices.

A further object of the invention is to provide interchangeable strips of metal or any other desirable material having marked thereon a price-scale to correspond to and to register with the pound-marks on the scale-arc; also, to have indicated on these portable strips the price per pound for all commodities sold by a person having one of my improved computing and weighing devices.

A further object of my invention is to provide an arc of increasing radius for a weighing-scale in combination with a computing device, said arc resembling somewhat in contour a logarithmic curve. By this means I obviate the necessity of providing additional weights on a counterpoise when weighing.

A further object of the present invention is to employ a spur-wheel for suspending the weighing-post, which is provided with a suitable rack for engagement with the spur or toothed wheel.

A further object of the invention is to employ a modified counterbalance, consisting of a rack suspended on the opposite side of the spur-wheel, which meshes with the weighing-post rack.

A further object of my invention is to so modify the combined computing and weighing device that it can be suspended for store purposes, but more especially for out-of-door work, where it may be necessary to weigh bales of hay, farm products, and the like.

A further object of my invention is to so construct and arrange the rack or post with a knuckle-joint near its lowermost end, which is provided with a knife-edge for engagement with a lever connected to a weighing-scale.

A further object of my invention is to locate the weighing-platform on or near the same level with the computing-platform.

To more fully elucidate my invention, I will proceed to describe the drawings, in which—

Figure 1 is a side elevation of my improved computing and weighing device, some of the parts being broken away and shown in section. Fig. 2 is a detail in plan view on a reduced scale. Fig. 3 is also a side elevation of my improved device, being broken away and shown in section and the computing strip or arc removed. Fig. 4 is a rear elevation of my improved device with the scales removed. Fig. 5 is a plan or top view of the device with only a portion of the scales shown. Fig. 6 is a view similar to Fig. 1, but showing a modified form of counterbalance. Fig. 7 is a side elevation of my device with the arcs extended and shown in a suspended form. Fig. 8 is a front elevation of the suspended device.

My invention consists of a base A for supporting the weighing and computing device. The device is also provided with supplemental bases $a$ and $a'$, respectively. Secured to base $a$ are standards A' for supporting the general weighing mechanism. Secured to the upper portion of said standards A' is a bracket B, which supports friction-rollers $b\ b$, &c., for keeping in alinement and allowing a reciprocating movement to a post C. Said post C has an extension 12 at its lowermost end, which is jointed at 11 and which is provided with a knife-edge bearing for supporting the free end of a lever 10, which will be hereinafter more fully set forth.

Located in standards A' are roller-bearings for retaining in position shaft E, said shaft supporting a spur gear-wheel F, which meshes into the rack formed by pins $c$, located in post C, previously referred to. Mounted immediately in front and adjacent to said gear-

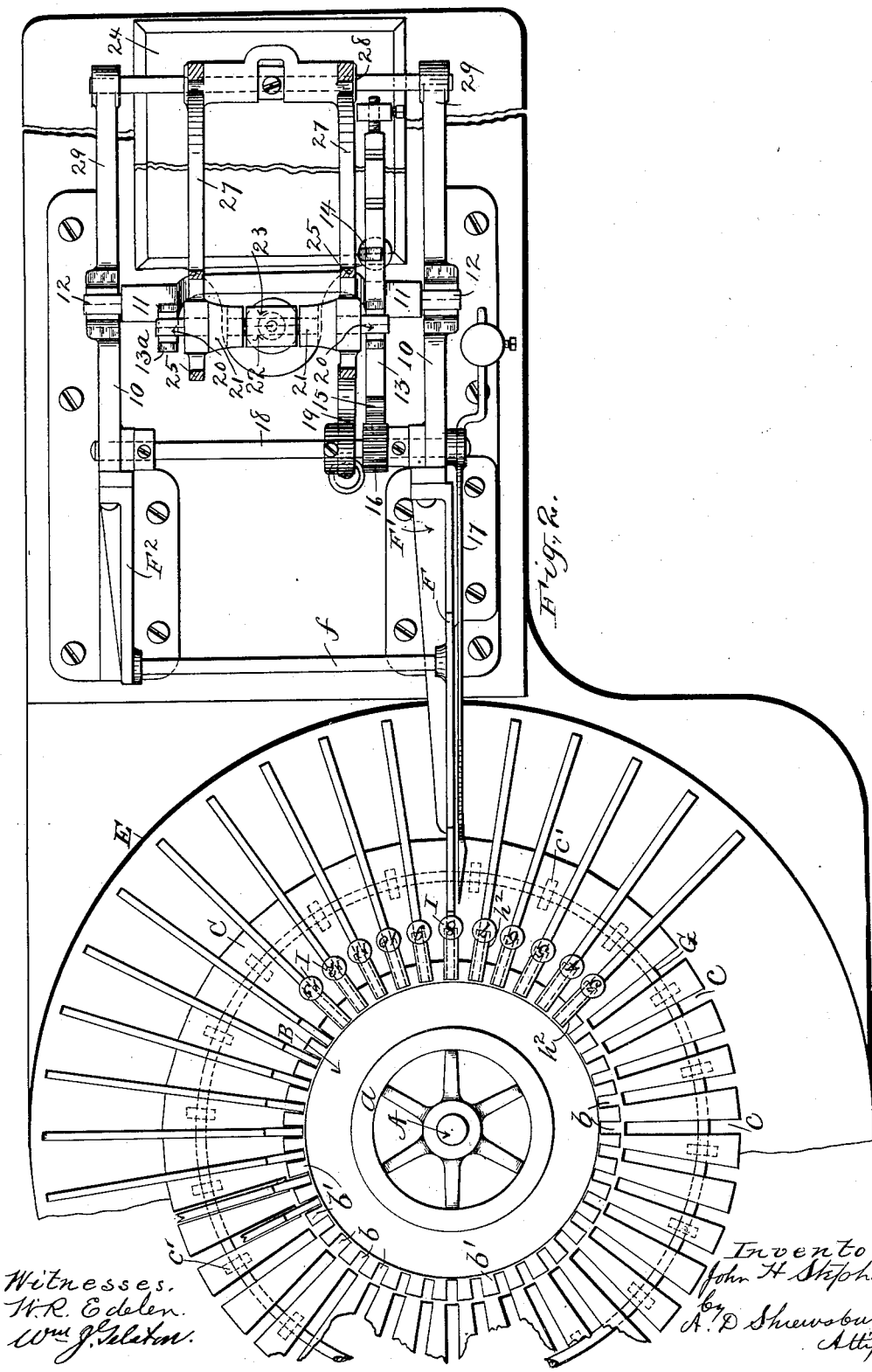

No. 628,560. Patented July 11, 1899.
J. H. STEPHENS.
COMBINED COMPUTING DEVICE AND WEIGHING SCALE.
(Application filed Feb. 19, 1898.)
(No Model.) 4 Sheets—Sheet 3.
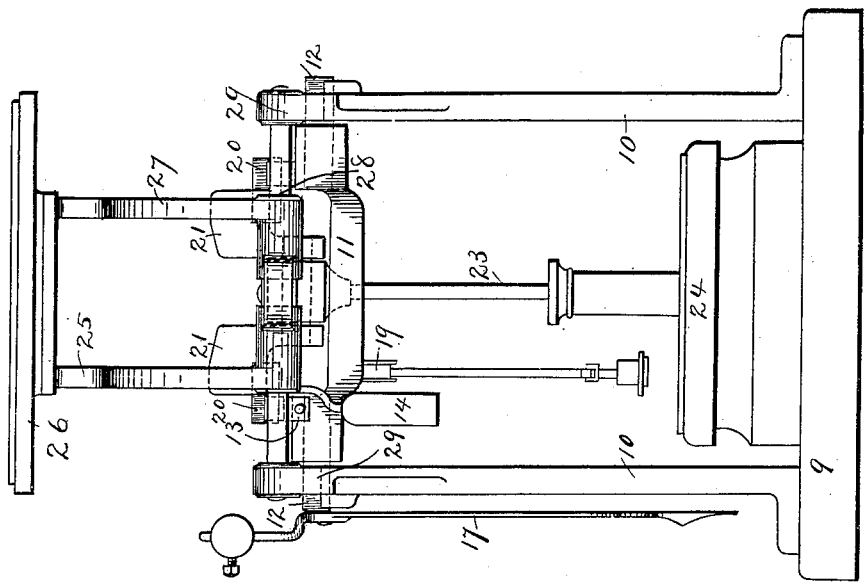
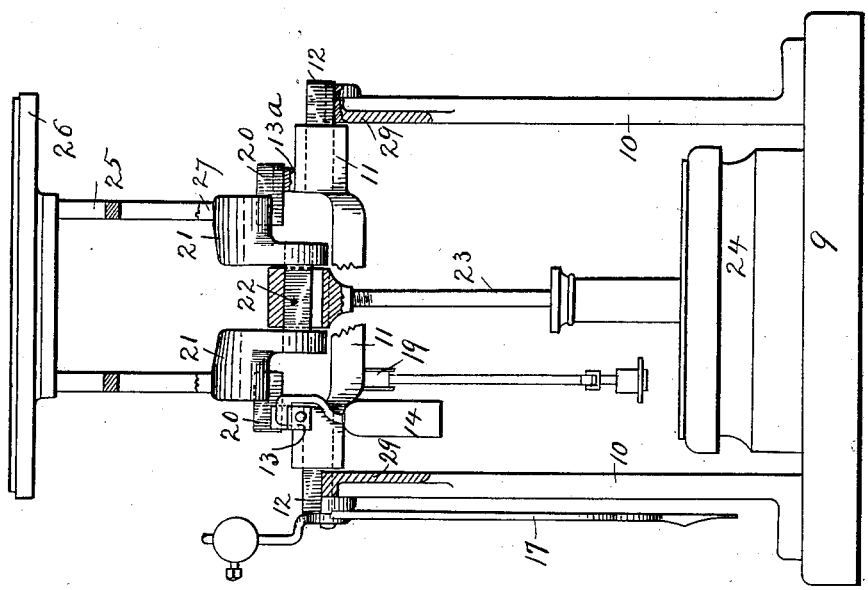

No. 628,560. Patented July 11, 1899.
J. H. STEPHENS.
COMBINED COMPUTING DEVICE AND WEIGHING SCALE.
(Application filed Feb. 19, 1898.)
(No Model.) 4 Sheets—Sheet 4.
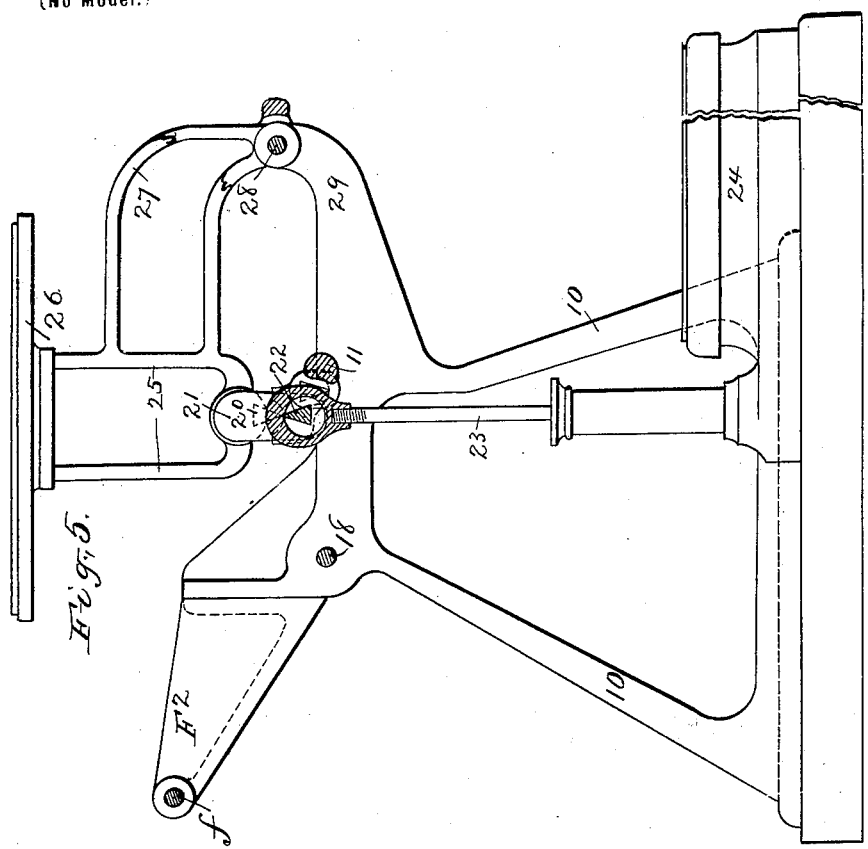
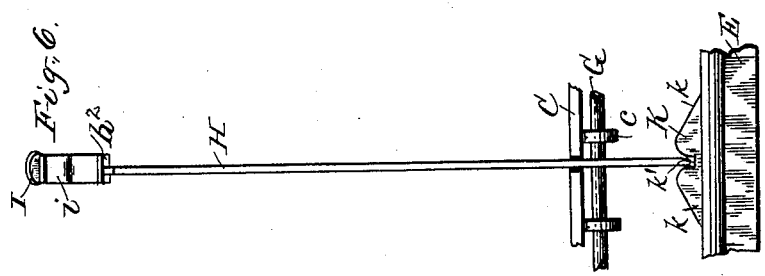
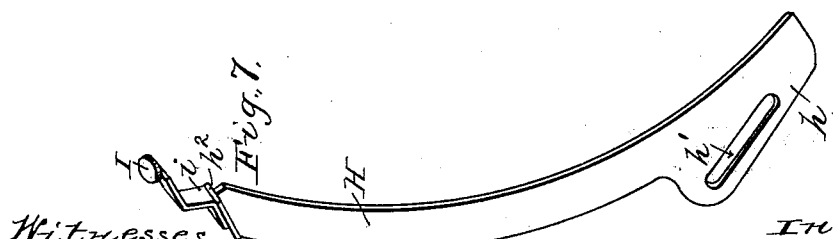
Witnesses,
H. R. Edelen.
Wm. J. Gelston.
Inventor.
John H. Stephens,
by A. D. Shrewsbury
Atty

UNITED STATES PATENT OFFICE.

JOHN H. STEPHENS, OF VERNON, TEXAS.

COMBINED COMPUTING DEVICE AND WEIGHING-SCALE.

SPECIFICATION forming part of Letters Patent No. 628,560, dated July 11, 1899.

Application filed February 19, 1898. Serial No. 670,894. (No model.)

*To all whom it may concern:*

Be it known that I, JOHN H. STEPHENS, a citizen of the United States, residing at Vernon, in the county of Wilbarger and State of Texas, have invented certain new and useful Improvements in a Combined Computing Device and Weighing-Scale; and I do hereby declare the following to be a full, clear, and exact description of the invention, such as will enable others skilled in the art to which it appertains to make and use the same.

My invention has reference to improvements in a combined computing device and weighing-scale; and it consists of certain novel features of construction, which will be hereinafter fully described in the specification and pointed out in the claims.

The object of the present invention is to construct a simple, cheap, economic, and efficient computing device in combination with a scale which will also be simple and economic in its construction. The computing device and scale have the well-known quadrant with the pound-marks thereon and a balanced index-hand or pointer for ascertaining the weight indicated on said quadrant. Adjacent to the quadrant is the computing device, with its adjustable arcs for ascertaining the price per pound that may be indicated by the pointer aforesaid. This computing device partakes of the nature of a skeleton structure, there being no surrounding frame, as heretofore indicated on my previous inventions pending in the Office.

The main features of the device consist of a central post or standard bearing two disks which are radially slotted for holding in position the computing-arcs. The device is revolved by means of a hand-wheel secured to the post or standard on a frictional base. The upper disk has an annular pendent flange or step for holding in position a computing-arc adjacent to the scale-arc when necessary to ascertain the price of a commodity that may be weighed.

The scale is provided on the axle of the index-hand with an increasing-arc and its accompanying weight pendent therefrom. The index-hand is operated by a knife-edge lever which is provided at its free end with a poise for increasing the capacity of the scale, but more especially in combination with the platform-scales which are attached to the same connection operating the weighing pan or plate. The weighing pan or plate is held in position on its knife-edges by means of a lever connection, which is operatively secured to arms forming part of the frame of the scale.

For a further explanation of my invention I will refer to the drawings, in which—

Figure 1 represents my improved device, the scale being in side elevation and the computing device in central vertical section, with the rear computing-arcs removed. Fig. 2 represents my improved device in plan or top view, with a portion of the computing device partly broken away and a number of the computing-arcs removed. Fig. 3 is an end elevation of the scale only. Fig. 4 is a similar view with some portions broken away and other parts in section to more fully display its operative mechanism. Fig. 5 is a central longitudinal section of the scale. Fig. 6 is a front elevation in detail of one of the computing-arcs, exhibiting the means for automatically securing the foot of the same. Fig. 7 represents one of the computing-arcs in perspective view.

In the general description the computing device consists of a central post or standard A, which is provided with disks B and C, rigidly secured thereto, the lower part of said post being secured to a movable base D, which makes frictional contact with an annular boss $e$, integral with a primary base E. The primary base E supports said base D and holds it down securely to the boss $e$ by means of nuts $d\ d$, secured to post A. The extreme upper end of said post or standard A is provided with a hand-wheel $a$ for rotating the computing device. Disks B and C, previously referred to, have, respectively, radial slots $b$ and $c$ (see Figs. 1 and 2) for holding the computing-arcs H in their lateral position.

The disk B is flared or flanged at its extreme periphery $b'$ at an angle of about fifteen degrees, and extending from the root of this flange $b'$ is a depending flange $b^2$, which is also at an angle of fifteen degrees and parallel with said flange $b'$. Said flange $b^2$ is integral with disk B through the medium of an extension $b^3$, connecting the two flanges, respectively, $b'$ and $b^2$.

The lower disk C is provided with a number of lugs or projections $c'$, integral with said disk, for holding in position a ring G. Said ring can be composed of any number of pieces; but it is preferable to have it entire.

The computing-arcs H are enlarged at their bases $h$ and provided with slots $h'$, which engage with and ride upon the ring G, previously referred to. The upper ends of said arcs H are provided with a stop-plate $h^2$, wider than the thickness of said arcs, as shown at Figs. 6 and 7, respectively, for holding said arcs H in contact with the upper surfaces of flanges $b'$ or $b^2$. Secured to the top of plates $h^2$ are handles $i$ for manipulating said arcs from flanges $b'$ or $b^2$, respectively. Mounted on the extreme end of handles $i$ are figure-plates I for indicating the various prices of commodities sold, (see Fig. 2,) which indicates the figuring of the plates referred to.

Secured to the primary base E and immediately on alinement with the scale pound-arc is a stop K for holding said computing-strips H in exact alinement with said pound-arc, so that the graduations on both the pound-arc and also on the computing-arcs will exactly correspond.

The scale consists of a base 9, to which are secured standards 10 10, thus composing a frame for supporting the scale mechanism, which is composed of a shaft 11, having knife-edges 12 12, which rest in appropriate seats formed on the upper edges of standards 10 10. Integral with said shaft 11 is a scale-beam 13, extending on opposite side of said shaft and also its knife-edge 12. Said beam is provided with a poise 14 for balancing and also for increasing the capacity of the scale. The opposite end of said beam is provided with a toothed segment 15, which engages with a pinion 16 for operating an index-hand 17 through the medium of a shaft 18. Said segment also operates an increasing-arc 19, secured to shaft 18 and which is provided with a pendent weight for ascertaining the amount weighed by means of the index-hand. The beam 13 and also a short lever $13^a$, both of which are integral with shaft 11, have concave recesses for supporting knife-edges 20 20, which are secured in the arms 21 21, respectively. Said arms 21 are tied together by a knife-edge bearing 22, which sustains in a pendent position a weighing-rod 23, connecting with the platform-scales 24. (See Figs. 1 and 5.) Said arms 21 are cast integral with a light frame 25 for supporting a scale-pan 26. Said frame 25 is extended, as at 27, forming a lever, which is fulcrumed at 28 to brackets 29, extending from and forming part of standards 10 10, respectively. This lever connection of pan 26 holds said pan in a vertical position and also overcomes friction when operating the scales. Secured to the standards 10 10 are arms F' and $F^2$, and which are tied together by a rod $f$, for supporting a pound-arc F. The lowermost part of said arc is secured to the scale-base.

The scale-beam 13 is provided with an adjustable stop 30 for varying the travel of said beam.

When operating my improved computing and weighing apparatus, the operator utilizes hand-wheel $a$, turning it either to the right or left to suit his own convenience to bring the proper computing-arc on alinement with the scale pound-arc. The computing-arcs H are dropped down from the upper flange $b'$ to the lower flange $b^2$ only when necessary to use a special arc at a certain price per pound. The operator uses handle $i$ when necessary to bring down an arc, and as said arc drops upon the lower flange $b^2$ the lower portion $h$ of said arc rides forward by means of the rod G resting in the angular slot $h'$, and also when said arc is elevated said angular slot $h'$, acting on rod G, draws the arc back, as indicated in dotted lines, Fig. 1. The computing-arc is lowered before it comes in alinement with the scale pound-arc, and as the operator rotates the computing device said lowered arc rides upon the inclines $k$ of said stop K until it drops into the slot $k'$, thus bringing the arcs in alinement, when the operator, ascertaining the amount weighed by means of the index-hand, also ascertains the price of said weighing by means of the computing-arc, the present arc, which is in alinement with the pound-arc, indicating eight cents per pound. If the hand was at five pounds, the computing-arc would indicate forty cents at eight cents per pound. If an article is heavier than ten pounds, the operator puts the poise 14 in the notch "10" on the beam 13. He then makes a note at what point the index-hand stops. If it stopped at "5," the weighing would be fifteen pounds. Multiply the ten pounds by eight, making eighty cents, and then add the forty cents on the arc, making one dollar and twenty cents, the price for fifteen pounds at eight cents per pound.

Having described my invention, that which I desire to secure by Letters Patent of the United States is—

1. In combination with a weighing-scale having a shaft-supporting knife-edge bearings, a beam extending on opposite sides of said shaft, of a lever secured to said shaft, and arms having knife-edge bearings operatively connected to said beam and lever, a scale-pan supported by said arms through the medium of a frame lever connection located some distance to one side of said scale-pan and its knife-edge bearings to a pivoted or fulcrumed bracket, and a poise on one end of said beam, its opposite end having a toothed segment for engaging a toothed pinion for operating an index-hand and indicating the pounds and fractions thereof recorded on a scale-arc simultaneously with the sum total indicated on a computing-arc, substantially as described.

2. In combination with a weighing-scale having a shaft supporting knife-edge bearings on its extreme ends, a beam extending on opposite sides of said shaft, of a lever secured to said shaft, said beam and lever supporting arms on knife-edge bearings for operatively supporting a fulcrumed scale-pan, and a knife-edge bearing centrally located between said arms for supporting and operating a platform-scale through the medium of a beam having a poise on one end, and a toothed segment on its opposite end engaging a toothed pinion for operating an index-hand, whereby the pound-marks on a scale-arc may be indicated simultaneously with the sum total of such weighing on a computing-arc, substantially as described.

3. A computing device provided with a central standard or post for supporting disks, which are adapted to hold in position computing-arcs through the medium of radial slots formed in said disks, in combination with a weighing-scale having a pound-arc, and an index-hand for indicating simultaneously the amount weighed in pounds and also the sum total of such weighing on a computing-arc, substantially as described.

4. A computing device provided with disks, and forming a framework for supporting a number of computing-arcs, arranged radially around said disks, a post and base-plate for supporting said disks and computing-arcs, and the means for elevating a computing-arc from its operative position with a pound-arc of a weighing-scale, and holding it in a suspended or resting position within radial slots formed in said disks, substantially as described.

5. A computing device provided with a central standard or post for supporting disks having radial slots formed therein for holding in position computing-arcs, the upper disk having a double flange or flared portion, one flange located below the other flared portion or annular flange, and adapted to support the head or top of computing-arcs through the medium of plates projecting over the sides and at right angles to said computing-arcs, substantially as described.

6. A computing device provided with a post, disks, and a frictional base-plate secured to said post, a hand-wheel for revolving all the aforesaid parts, in combination with a computing-arc adapted to indicate with the pound-arc of a weighing-scale and indicate simultaneously the amount weighed and the price thereof through the medium of an index-hand, substantially as described.

7. A computing device having disks supported by a standard or post for holding in position computing-arcs, lugs integral with the lower disk, and an annular rod passing through said lugs for holding in position computing-arcs, and also for guiding forward said arcs through the medium of angular slots formed in said computing-arcs, in combination with a weighing-scale for indicating simultaneously the amount weighed and also the sum total of said weighing through the medium of an index-hand operated by a scale mechanism, substantially as described.

In testimony whereof I affix my signature in presence of two witnesses.

JOHN H. STEPHENS.

Witnesses:
W. R. EDELER,
REEVE LEWIS.